United States Patent [19]

Reynolds et al.

[11] 4,165,990

[45] Aug. 28, 1979

[54] COATINGS FOR REDUCED LOSSES IN (110) [001] ORIENTED SILICON IRON

[75] Inventors: William T. Reynolds, McMurray; Karl Foster, Pittsburgh, both of Pa.

[73] Assignee: Westinghouse Electric Corp., Pittsburgh, Pa.

[21] Appl. No.: 883,439

[22] Filed: Mar. 6, 1978

Related U.S. Application Data

[63] Continuation of Ser. No. 382,266, Jul. 24, 1973, abandoned.

[51] Int. Cl.[2] .................... C03C 5/02

[52] U.S. Cl. .................... 106/48; 106/52; 148/113; 148/122

[58] Field of Search .................... 148/113, 110, 112, 113, 148/122; 106/48, 52

[56] References Cited

U.S. PATENT DOCUMENTS

| | | | |
|---|---|---|---|
| 2,050,305 | 8/1936 | Frey et al. | 148/110 |
| 2,050,408 | 8/1936 | Yensen | 148/110 |
| 2,354,123 | 7/1944 | Horstmann et al. | 148/113 |
| 2,394,047 | 2/1946 | Elsey et al. | 148/110 |
| 3,162,553 | 12/1964 | Richards et al. | 148/113 |

OTHER PUBLICATIONS

Journal of the American Ceramic Society, vol. 39, #4, pp. 121–128.

Journal of the American Ceramic Society, vol. 44, #4, pp. 167 and 168.

*Primary Examiner*—W. Stallard

*Attorney, Agent, or Firm*—R. T. Randig

[57] ABSTRACT

Improved core losses at high operating inductions are obtained in (110) [001] oriented silicon iron through the application of a new coating to the finish gauge material and thereafter heat treating to effect transformation of the underlying steel to the (110) [001] orientation, desulfurizing the underlying steel as well as decarburizing the same. The coating, as fused, is characterized by excellent adherence and a high interlaminar resistance value.

5 Claims, No Drawings

COATINGS FOR REDUCED LOSSES IN (110) [001] ORIENTED SILICON IRON

This is a continuation of application Ser. No. 382,266 filed July 24, 1973 now abandoned.

BACKGROUND OF THE INVENTION

1. Field of the Invention

The present invention relates to a nominal 3% silicon iron which finds a wide usage as a core material in both power and distribution type transformers and includes a new coating, which when applied to the steel of finish gauge thickness which is thereafter subjected to a heat treatment, will provide the steel with an adherent coating having high interlaminar resistance values, aids in the transformation to the (110) [001] orientation, removes sulfur and carbon from the underlying steel and results in the underlying steel exhibiting improved core loss values at high operating inductions, that is inductions in excess of 15 kilogausses.

2. Description of the Prior Art

Grain oriented silicon steels, that is, those steels having cube-on-edge orientation or that orientation known as (110) [001] in terms of Miller indicies has been in commercial usage in transformers for over 30 years. By reason of the favorable orientation of the grains in a cube-on-edge texture, the silicon steels have developed favorable core loss properties. This orientation is usually accomplished by means of a distinct processing regimen coupled with heat treatments which are effective for producing that favorable cube-on-edge orientation.

More specifically, it has been found that in the case of cube-on-edge orientation, manganese sulfide particles within the microstructure are required in order to permit the favorably oriented grains to grow at the expense of the less favorably oriented grains so that the desired degree of cube-on-edge texture can be obtained within the final product. However, the presence of the manganese sulfide particles themselves are detrimental to the end quality magnetic characteristics exhibited by this steel since they reprecipitate upon cooling to room temperature and thereby adversely affect the magnetic characteristics because they inhibit domain wall movement as a result, coatings were developed which would retard the removal of the sulfur from the steel until the desired degree of orientation has taken place and thereafter the coating was effective in the desulfurizing of the steel during the high temperature treatment.

The coating most popularly employed for effecting this desired result was an MgO coating which reacted with the components on the surface of the steel to form a thin adherent layer of a highly insulating glass type constituent which was effective for producing a high degree of interlaminar resistance in addition to performing its other functions. It has been found, however, that the presence of this coating also inhibits any further decarburization that may take place during such high temperature heat treatment with the result that optimum properties could not be attained in the final heat treated steel.

The coating of the present invention overcomes these difficulties and enhances the degree of grain transformation to attain improved magnetic characteristic, is effective for desulfurizing the steel and in addition, decarburizes the steel still further with the result that improved core loss characteristics are observed in the underlying steel when operated at an induction in excess of 15 kilogausses. As a result, the coating of the present invention has resulted in a new magnetic steel product having improved magnetic characteristics which were not heretofore attainable by the prior art practices employed in commercially produced type M-4 silicon steel.

SUMMARY OF THE INVENTION

The present invention relates to a coating composition for use on transformer core magnetic materials and consists essentially of from about 15% to about 80% iron oxide, up to about 40% SiO2 and the balance essentially MgO. This coating when applied to the surface of magnetic steel sheet, preferably in the thickness of between 0.1 and about 0.5 mil per side is thereafter heat treated at a temperature within the range between about 1100° C. and about 1300° C. to effect transformation of the underlying steel to provide a high proportion of grains having a (110) [001] type orientation, to remove sulfur from the steel as well as to decarburize the steel and form a tenacious coating which is fused to and covers the surface of the steel to provide for a high interlamination resistance value. Good results were obtained when the steel is heated to and cooled from the heat treatment temperature at a rate of 50° C. per hour. The steel as processed to 11 mil thickness, will exhibit a core loss of less than about 0.7 watt per pound when measured at 17,000 gauss at a frequency of 60 Hertz.

DESCRIPTION OF THE PREFERRED EMBODIMENT

The magnetic steel to which the present invention relates is a nominal 3% silicon steel, but may have a silicon content ranging between about 2% and about 5% by weight of silicon, about 0.06% to about 0.12% manganese, about 0.01% to about 0.03% sulfur, less than 0.03% carbon and the balance essentially iron with incidental impurties.

The steel is in the cold worked condition and of a finish gauge normally of from about 0.011 to 0.013 inch in thickness though thicker or much thinner gauges about 2 mils can be treated. Prior to the application of the coating to the steel, it is preferred to subject the steel to a decarburizing strip anneal usually at a temperature within a range between about 750° C. and about 900° C. while subjecting the same to a wet hydrogen atmosphere, that is, a hydrogen atmosphere having a dew point in excess of about +60° F. As thus decarburized, the steel is then ready for the coating to be applied to the surface.

The coating of the present invention consists essentially of from about 15% to about 80% iron oxide, up to about 40% $SiO_2$, and the balance, a minimum of 20% essentially MgO. In this respect it has been found that the iron oxide may take any readily available form and good success has been had with using $Fe_2O_3$ as well as the naturally occurring mineral magnetite ($Fe_3O_4$) and mixtures of iron oxides. It has also been found that good results are obtained where nickel oxide is substituted in whole or part for the iron oxide. Regardless of the actual form of the iron oxide, it is preferred to have the iron oxide, the $SiO_2$and the MgO in a finely divided condition so that they may be intimately admixed and readily suspended in a liquid vehicle. Good success has been attained where the particle size of each of the components of the coating composition are about −300 mesh.

A preferred range for the coating composition includes from about 30% to about 60% iron oxide, from about 30% to about 50% $SiO_2$ and the balance essentially MgO. The components of the coatings are usually suspended in water and a suspending agent such as polyvinyl alcohol in amounts up to about 4% may be added in order to improve the adherence of the coatiing to the bare steel strip. The coating may be applied by dipping, rolling, brushing or air-gun spray or in any other convenient manner. However, it should be noted that the applied, unfused coating thickness should be within the range between 0.1 and about 0.5 mil per side of the steel sheet.

Since the MgO is the active component for sulfur removal during subsequent heat treatment, it is preferred to maintain the MgO content at a minimum of about 50% when the coating thickness approaches the lower limit of about 0.1 mil per side. On the other hand, where the coating thickness approaches the upper limit of about 0.5 mil per side, the MgO may be present in a minimum amount of about 20%.

Preferably, the applied coating suspension is dried to remove the liquid vehicle and the coated steel may be wound in coil configuration or if it is applied to a shaped lamination, the individual laminations may be stacked and charged into the furnace prior to the commencement of the heat treatment. The coated steel is thereafter subjected to a heat treatment at a temperature within the range between about 1100° C. and about 1300° C. for a time period ranging between about 6 hours and about 36 hours. A preferred heat treatment consist of heating the coated materials to a temperature within the range between about 1150° C. and 1250° C. for a time period range in between about 18 hours and about 30 hours. During such high temperature heat treatment, the steel is maintained with a protective reducing atmosphere, preferably hydrogen having a dew point of less than about −40°. During such heat treatment, primary grain growth is inhibited by the presence of the manganese sulfide until the preferred secondary recrystallization has taken place during which time those grains having the preferred (110) [001] orientation grow at the expense of the surrounding grains due to the manganese sulfide particles going into solution. The steel is also further decarburized by reaction with iron oxide and the silicon dioxide present within the coating. At the same time, the components of the coating also fuse to provide a very tenacious thin glass-like film on the surface of the underlying steel which has a very high interlaminar resistance thereby insulating the convolutions of the coil or the adjacent stacked laminations without adhering to one another.

Following holding at the heat treatment temperature for the required period of time, the steel is thereafter cooled to room temperature. The heating to the heat treatment temperature and the cooling from the heat treatment down to room temperature takes place at a rate which preferably does not exceed about 50° C. per hour. Following cooling to room temperature, the underlying steel will exhibit improved watt losses when measured at high inductions, that is that induction in excess of 17000 gauss.

In order to demonstrate the present invention, reference may be had to the following: Silicon steel sheet having a thickness of 0.011 inch after a decarburization anneal, had the following listed chemical composition:

| | |
|---|---|
| Silicon | 3.03% |
| Manganese | 0.093% |
| Sulfur | 0.023% |
| Carbon | 0.005% |
| Phosphorus | 0.006% |
| Aluminum | 0.001% |

Epstein samples of the foregoing steel were coated by either brushing or air-gun spraying, a deionized water slurry containing 1% polyvinyl alcohol and the various coating materials in Table I, followed by drying under heat lamps. Thereafter, the samples having the various coatings as set forth hereinafter, were annealed in dry hydrogen (−40° C. dew point) for 24 hours at 1200° C., the heating and cooling taking place at the rate of 50° C. per hour.

Reference is directed to Table I which includes the composition of the coatings and the magnetic characteristics exhibited thereby, following treatment as described:

TABLE I

| | dc | | | 60 Hz | | |
|---|---|---|---|---|---|---|
| Coating | $H_c$ (Oe) | $B_r$ (kG) | $B_{10}$ (kG) | $P_{c17}$ (W/lb) | $P_{c18}$ (W/lb) | % C |
| 100 MgO (Avg.) | 0.090 | 15.4 | 18.6 | 0.70 | 0.88 | 0.0024 |
| 50 $Fe_3O_4$, 50 MgO | 0.085 | 15.4 | 18.7 | 0.66 | 0.83 | 0.0014 |
| 30 $Fe_3O_4$, 30 $Fe_2O_3$, 40 MgO | 0.090 | 15.9 | 18.8 | 0.67 | 0.82 | 0.0013 |
| 30 $Fe_3O_4$, 40 $SiO_2$, 30 MgO | 0.085 | 15.2 | 18.8 | 0.65 | 0.82 | 0.0017 |
| Typical M4 | — | — | 18.4 | 0.72 | 0.91 | — |

For comparison purposes Table I contains data relative to a straight MgO coated steel and data of typical AISI Type M-4 silicon steel magnetic characteristics. From the test result recorded in Table I, it is immediately seen that there is no significant change in the $B_{10}$ characteristics for the MgO coated steel vs. the steel coated with the compositions of the present invention. However, a comparison of the losses at 17 kilogauss and at 18 kilogauss makes it clear that there is a substantial improvement in the watt loss characteristics when employing the coatings of the present invention. These core loss characteristics also show substantial improvement over the typical Type M-4 characteristics at the same induction.

A comparison of the last column in the Table relating to carbon content indicates that after heat treatment with the coating of the present invention applied, there has been a material reduction in the carbon content which apparently is a contributing factor to the improved watt loss characteristic at the high inductions. The coatings containing $Fe_3O_4$, all measured in significantly lower losses at high inductions than the straight MgO coatings and the loss level of the 50 $Fe_3O_4$, 50 MgO coated steel is considerably lower than the all MgO coated steel average. Moreover, the coatings of this invention all had good adherence and had high interlaminar resistance values.

An additional series of experiments were run in which silicon steel having the same chemical composition was employed, and various ratios and proportions of $Fe_2O_3$ and $Fe_3O_4$ were added to MgO and again heat treated in the same manner as the examples with respect to Table I. The results are set forth on Table II.

TABLE II

| Coating | dc $H_c$ (Oe) | dc $B_r$ (kG) | dc $B_{10}$ (kG) | 60 Hz $P_{c17}$ (W/lb) | 60 Hz $P_{c18}$ (W/lb) | % C |
|---|---|---|---|---|---|---|
| 25 $Fe_3O_4$, 75 MgO | 0.089 | 15.7 | 18.7 | 0.70 | 0.86 | 0.0015 |
| 75 $Fe_3O_4$, 25 MgO | 0.091 | 15.9 | 18.7 | 0.67 | 0.85 | 0.0015 |
| 20 $Fe_2O_3$, 80 MgO | 0.089 | 16.0 | 18.7 | 0.67 | 0.87 | 0.0013 |
| 50 $Fe_2O_3$, 50 MgO | 0.91 | 15.7 | 18.6 | 0.67 | 0.87 | 0.0012 |
| 80 $Fe_2O_3$, 20 MgO | 0.91 | 15.7 | 18.7 | 0.68 | 0.68 | 0.0012 |

From the test results recorded in Table II, it is readily apparent that improved core loss properties are obtained when utilizing the coatings having the compositions set forth hereinbefore in Table II. It is noteworthy, however, that the addition of the silica and the mixed $Fe_2O_3$ and $Fe_3O_4$ gave lowest results although the general improvement was noted throughout with the addition of the iron oxide to the MgO coating. Once again a comparison of the carbon contents reveals the substantial decarburization has also taken place, which probably accounts for the improved watt losses exhibited by the steel when treated in accordance with the present invention.

Since the coatings of the present invention can be applied in the manners presently being used in the commercial production of 3% silicon steel without the addition of extra equipment, the present coatings can be readily employed in the commercial production of silicon steel with the result that improved magnetic characteristics are obtainable in the (110) [001] type oriented silicon steel especially where the material is employed at high operating induction, that is, at operating inductions in excess of about 17 kilogauss. These results show that quite consistently watt loss values of about 0.7 watt per pound or less at 17 kilogauss are obtained in 11 mil thick sheets when employing the compositions and processing according to the present invention.

We claim:

1. A coating composition for use on transformer core materials consisting essentially of from about 15% to about 80% iron oxide, up to 50% $SiO_2$ and the balance with a minimum of 20%, essentially MgO.

2. The coating of claim 1 in which the iron oxide is present in the form of magnetite.

3. The coating of claim 1 in which the iron oxide is present in the form of $Fe_2O_3$.

4. The coating of claim 1 in which the iron oxide is present as a mixture of magnetite and $Fe_2O_3$.

5. A coating composition for use on transformer core materials consisting essentially of from about 30% to about 60% iron oxide, from about 30% to about 50% $SiO_2$ and the balance essentially MgO.

* * * * *